(12) United States Patent
Takamoto

(10) Patent No.: US 12,392,465 B2
(45) Date of Patent: Aug. 19, 2025

(54) VEHICLE LAMP

(71) Applicant: STANLEY ELECTRIC CO., LTD., Tokyo (JP)

(72) Inventor: Tsuyoshi Takamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/853,212

(22) PCT Filed: Mar. 27, 2023

(86) PCT No.: PCT/JP2023/012215
§ 371 (c)(1),
(2) Date: Oct. 1, 2024

(87) PCT Pub. No.: WO2023/195371
PCT Pub. Date: Oct. 12, 2023

(65) Prior Publication Data
US 2025/0243983 A1    Jul. 31, 2025

(30) Foreign Application Priority Data

Apr. 6, 2022   (JP) ................... 2022-063342

(51) Int. Cl.
F21S 41/24   (2018.01)
(52) U.S. Cl.
CPC .................... F21S 41/24 (2018.01)
(58) Field of Classification Search
CPC .. G02B 6/0041; G02B 6/0043; G02B 6/0016; G02B 6/0025; F21S 43/245; F21S 43/239; F21S 43/237; F21S 43/241; F21S 43/315; F21S 43/332; B60Q 2400/20; B60Q 2400/30; B60Q 2400/40; B60Q 2400/50; B60Q 1/0041; B60Q 1/0035;
(Continued)

(56) References Cited

U.S. PATENT DOCUMENTS

2009/0195729 A1* 8/2009 Little ................. G02B 6/0056
349/64

FOREIGN PATENT DOCUMENTS

CZ       2017773 A3 *  6/2019
DE  102004015544 A1 * 11/2004 ............ B60Q 1/26
JP    H06160638 A  *  6/1994
(Continued)

OTHER PUBLICATIONS

Search English translation of CZ 2017773 A3 (Year: 2019).*
(Continued)

Primary Examiner — Omar Rojas Cadima
(74) Attorney, Agent, or Firm — Holtz, Holtz & Volek PC

(57) ABSTRACT

A vehicle lamp includes light sources, and a light guide body configured to guide light emitted from the light sources from one end side toward an other end side of the light guide body. The light guide body has a shape in which a first light guide part located in front of the light sources and a second light guide part extending in one direction between one end side and the other end side are connected. The second light guide part has a plurality of light emitting parts, which are disposed side by side in one direction and which are configured to emit the light by diffusing the light, and transmissive parts which are disposed between the neighboring light emitting parts and which are configured to transmit the light.

5 Claims, 12 Drawing Sheets

(58) Field of Classification Search
CPC ... B29C 64/124; B29C 64/165; B29C 64/194; B29C 64/188; B29C 64/112; B29C 64/118
See application file for complete search history.

(56) References Cited

FOREIGN PATENT DOCUMENTS

| | | |
|---|---|---|
| JP | 2019033044 A | 2/2019 |
| JP | 2020024867 A | 2/2020 |
| JP | 2020031016 A | 2/2020 |

OTHER PUBLICATIONS

Search English translation of JP H06160638 A (Year: 1994).*
Search English translation of DE 102004015544 A1 (Year: 2004).*
International Search Report (ISR) (and English language translation thereof) dated May 23, 2023 issued in International Application No. PCT/JP2023/012215.
Written Opinion dated May 23, 2023 issued in International Application No. PCT/JP2023/012215.

* cited by examiner

VEHICLE LAMP

TECHNICAL FIELD

The present invention relates to a vehicle lamp.

Priority is claimed on Japanese Patent Application No. 2022-063342, filed Apr. 6, 2022, the content of which is incorporated herein by reference.

BACKGROUND ART

In the related art, as a vehicle lamp mounted on a vehicle, there is known a configuration in which a light source such as a light emitting diode (LED) or the like and a light guide body such as an inner lens or the like are combined (for example, see the following Patent Document 1). In such a vehicle lamp, due to the diversification of design, various forms of configurations have been developed.

For example, the following Patent Document 1 discloses a vehicle lamp including a light guide body constituted by a multi-color molded product having a rod-shaped part formed of a first resin material and a plate-shaped part formed of a second resin material containing a light diffusing material, and a light source, in which light emitted from the light source enters from a light incidence surface of the rod-shaped part, and light entering the plate-shaped part from the rod-shaped part via a connecting convex portion is emitted from a main surface of the plate-shaped part by a light diffusing material.

CITATION LIST

Patent Document

Patent Document 1: Japanese Unexamined Patent Application, First Publication No. 2019-033044

SUMMARY OF INVENTION

Technical Problem to be Solved

Incidentally, in the invention disclosed in the above-mentioned Patent Document 1, by emitting the light diffused by the light diffusing material from the main surface of the plate-shaped part, it is possible to make the light emitting surface of the plate-shaped part emit light uniformly.

However, in the invention disclosed in the above-mentioned Patent Document 1, it is difficult to create a three-dimensional effect or a floating feeling of emission caused by the emission of the light emitting surface.

An aspect of the present invention is directed to providing a vehicle lamp capable of creating a three-dimensional effect or a floating feeling of emission.

Solution to Solve Problem

An aspect of the present invention provides the following configurations.

(1) A vehicle lamp including:
light sources; and
a light guide body configured to guide light emitted from the light sources from one end side toward other end side of the light guide body,
wherein the light guide body has a shape in which a first light guide part located in front of the light source and a second light guide part extending in one direction between the one end side and the other end side are connected, and
the second light guide part has a plurality of light emitting parts, which is disposed side by side in the one direction and which is configured to emit the light by diffusing the light, and transmissive parts which are disposed between the neighboring light emitting parts and which are configured to transmit the light.

(2) The vehicle lamp according to the above-mentioned (1), wherein the light sources are disposed on both ends of the light guide body so as to face each other, and
the light guide body guides one light emitted from one light source from the one end side toward the other end side of the light guide body, and guides the other light emitted from the other light source from the other end side toward one end side of the light guide body.

(3) The vehicle lamp according to the above-mentioned (1), wherein the light emitting part is configured by disposing a light diffusing material in a part of a light transmitting member that constitutes the light guide body.

(4) The vehicle lamp according to the above-mentioned (3), wherein the light guide body is formed by two-color molding of the light transmitting member and the light diffusing material.

(5) The vehicle lamp according to the above-mentioned (3), wherein the light diffusing material includes a first connecting part that connects neighboring ones of the light emitting parts, and
the first connecting part connects part of neighboring light emitting parts other than at least front surface sides of the light emitting parts.

(6) The vehicle lamp according to the above-mentioned (5), wherein the light transmitting member includes a second connecting part that connects neighboring ones of the transmissive parts, and
the second connecting part connects at least parts of the transmissive parts of the neighboring transmissive parts.

(7) The vehicle lamp according to the above-mentioned (5), including a light shielding member disposed to cover a range overlapping with the first connecting part of the light guide body when seen in a front view and an entire surface of the light guide body on an upper surface side.

(8) The vehicle lamp according to the above-mentioned (6), wherein the second light guide part has a plurality of reflection cuts that is disposed on the second connecting part and the transmissive parts and that is configured to reflect light toward the light emitting part.

Advantageous Effects of Invention

According to the aspect of the present invention, it is possible to provide a vehicle lamp capable of creating a three-dimensional effect or a floating feeling of emission.

DESCRIPTION OF EMBODIMENTS

Figure 1:
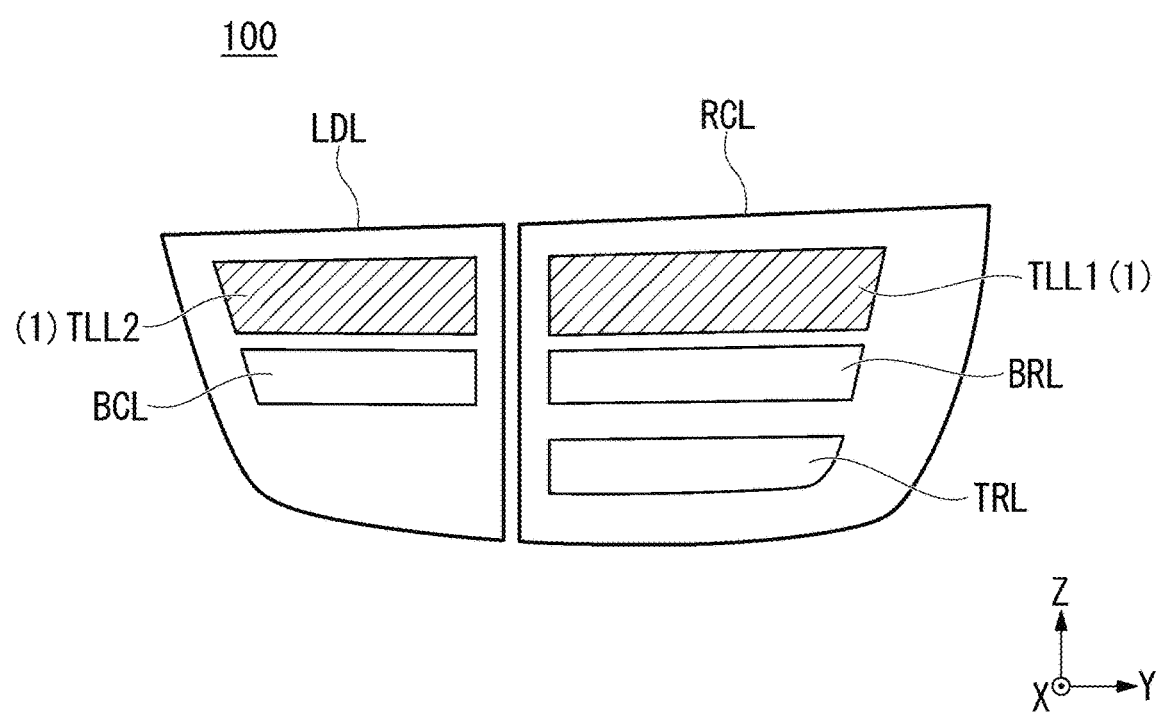
FIG. 1 is a front view showing a configuration of a vehicle lamp unit including a vehicle lamp according to an embodiment of the present invention.

Hereinafter, an embodiment of the present invention will be described with reference to the accompanying drawings in detail.

Further, in the drawings used in the following description, in order to make each component easier to see, dimensions of each component may be shown at different scales, and dimensional ratios of each component may not necessarily be the same as the actual ones.

As the embodiment of the present invention, for example, a vehicle lamp 1 shown in FIG. 1 to FIG. 7 will be described.

Figure 2:
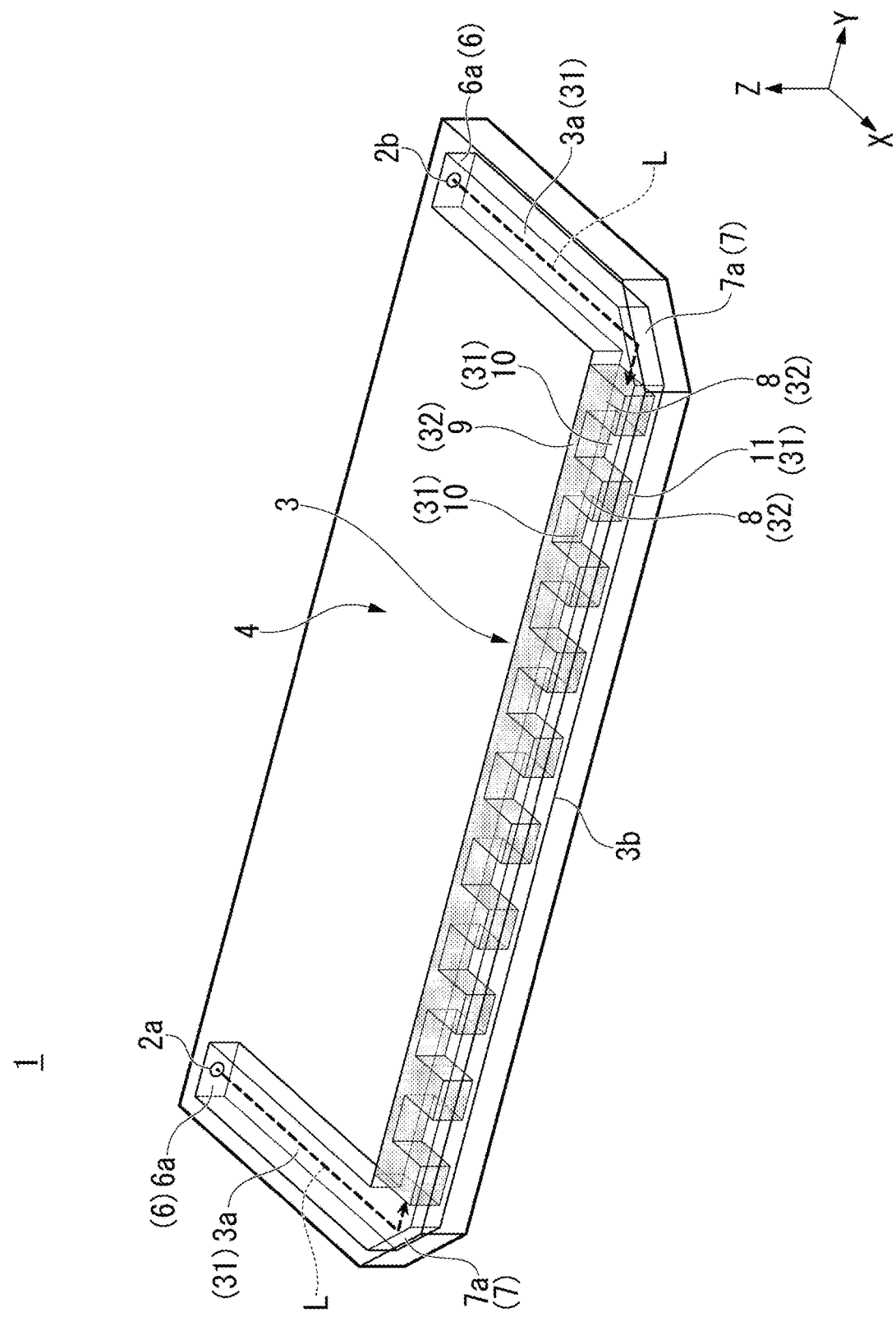
FIG. 2 is a perspective view showing the configuration of the vehicle lamp shown in FIG. 1.
Figure 3:
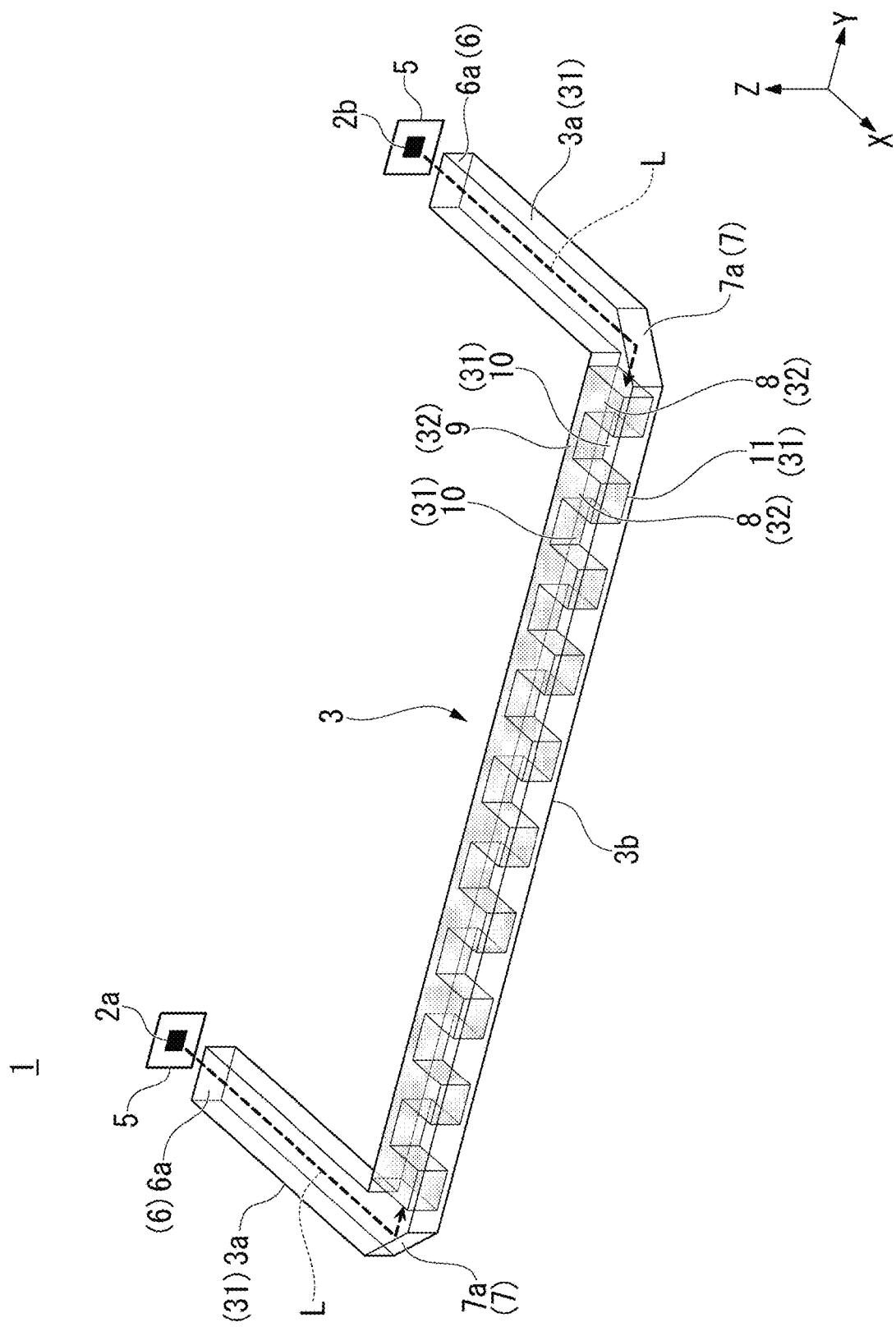
FIG. 3 is a perspective view showing a state in which a cover lens is omitted in the configuration of the vehicle lamp shown in FIG. 2.
Figure 4:
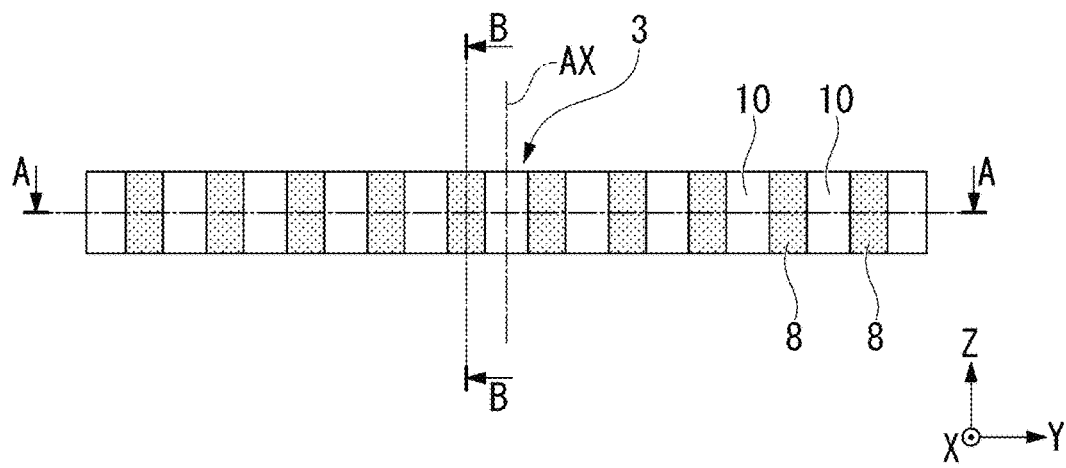
FIG. 4 is a front view showing the configuration of the vehicle lamp shown in FIG. 3.
Figure 5:
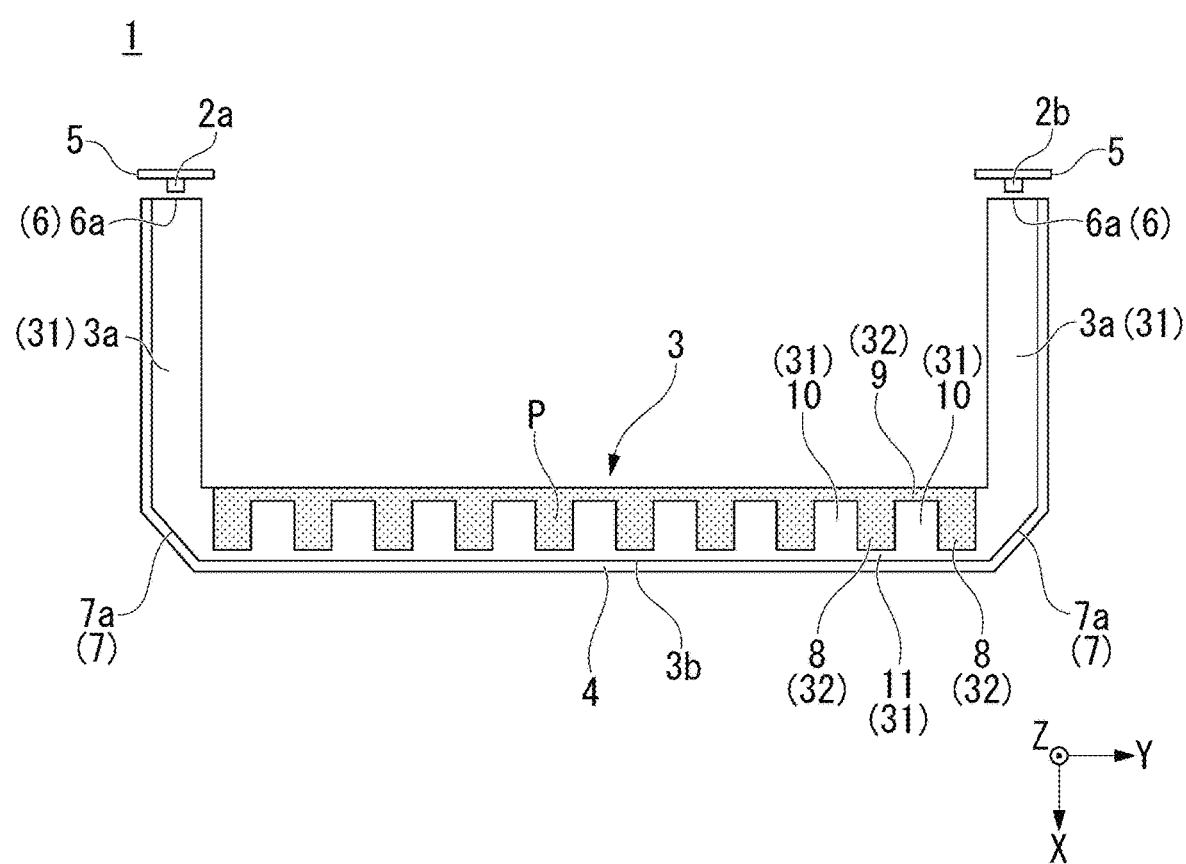
FIG. 5 is a cross-sectional view of the vehicle lamp along line segment A-A shown in FIG. 4.
Figure 6:
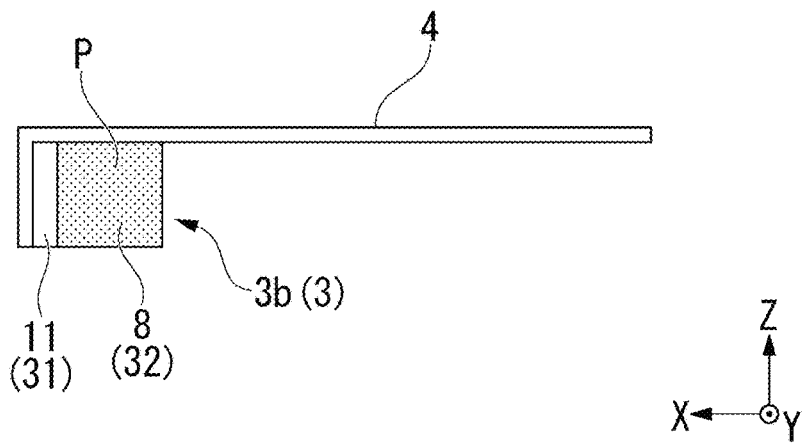
FIG. 6 is a cross-sectional view of the vehicle lamp along line segment B-B shown in FIG. 4.
Figure 7:
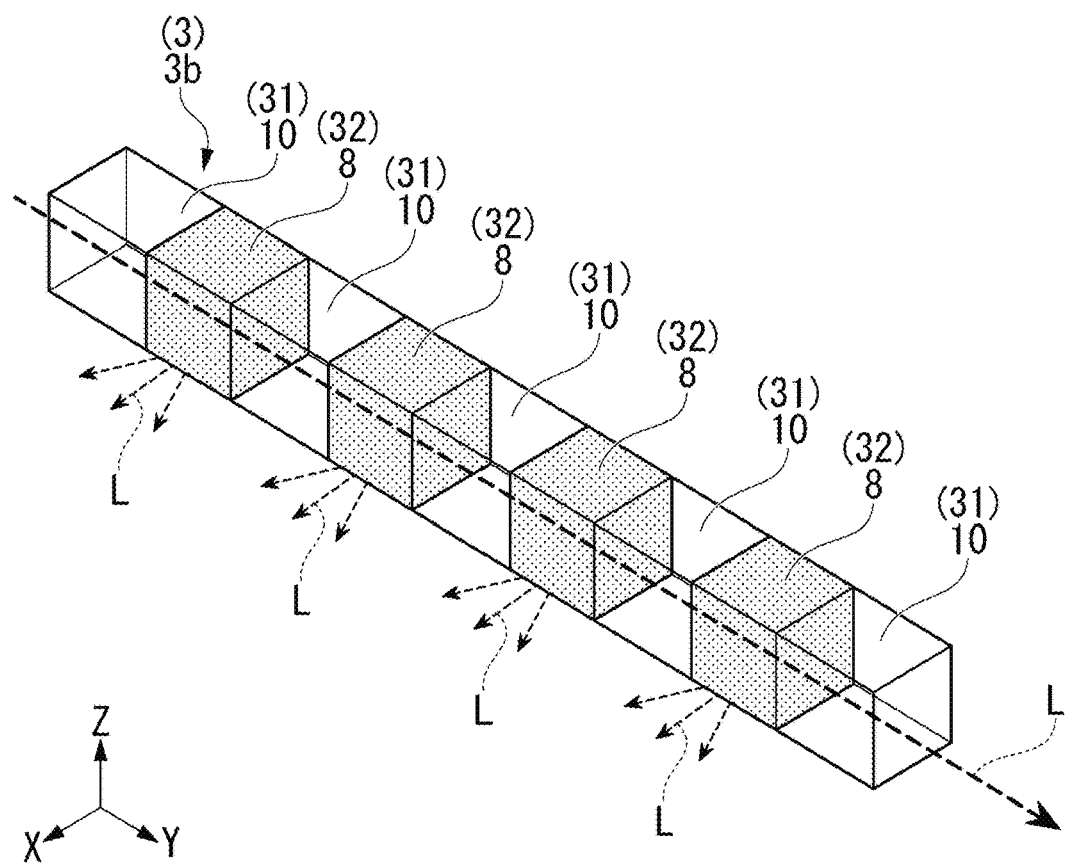
FIG. 7 is a perspective view for describing a structure for emission by the vehicle lamp shown in FIG. 2.

Further, FIG. 1 is a front view showing a configuration of a vehicle lamp unit 100 including the vehicle lamp 1. FIG. 2 is a perspective view showing a configuration of the vehicle lamp 1. FIG. 3 is a perspective view showing a state in which a cover lens 4 is omitted in the configuration of the vehicle lamp 1. FIG. 4 is a front view showing the configuration of the vehicle lamp 1 shown in FIG. 3. FIG. 5 is a cross-sectional view of the vehicle lamp 1 along line segment A-A shown in FIG. 4. FIG. 6 is a cross-sectional view of the vehicle lamp 1 along line segment B-B shown in FIG. 4. FIG. 7 is a perspective view for describing a structure for emission by the vehicle lamp 1.

In addition, in the drawings shown below, an XYZ orthogonal coordinate system is set, an X-axis direction indicates a forward/rearward direction (a lengthwise direction) of the vehicle lamp 1, a Y-axis direction indicates a leftward/rightward direction (a widthwise direction) of the vehicle lamp 1, and a Z-axis direction indicates an upward/downward direction (a height direction) of the vehicle lamp 1.

The vehicle lamp 1 of the embodiment is an application of the present invention to tail lamps TLL1 and TLL2 that emit red light as function lamps in the vehicle lamp unit 100 including, for example, rear combination lamps RCL mounted on both corner parts on a rear end side of a vehicle (not shown) as shown in FIG. 1, and lid lamps LDL mounted on both sides of a back gate or a trunk lid of the vehicle.

The rear combination lamp RCL and the lid lamp LDL are provided side by side in the widthwise direction (Y-axis direction) of the vehicle.

The rear combination lamp RCL has a first tail lamp TLL1 configured to emit red light, a brake lamp BRL configured to emit red light, and a turn lamp TRL configured to emit orange light, as function lamps. The first tail lamp TLL1, the brake lamp BRL and the turn lamp TRL are provided side by side in the upward/downward direction (Z-axis direction) of the vehicle.

The lid lamp LDL has a second tail lamp TLL2 configured to emit red light, and a back lamp BCL configured to emit white light, as function lamps. The second tail lamp TLL2 and the back lamp BCL are provided side by side in the upward/downward direction of the vehicle.

In addition, the first tail lamp TLL1 and the second tail lamp TLL2 are provided side by side between the rear combination lamp RCL and the lid lamp LDL in the widthwise direction of the vehicle.

The vehicle lamp 1 of the embodiment is applied to the first tail lamp TLL1 and the second tail lamp TLL2 provided in the vehicle lamp unit 100 (the rear combination lamp RCL and the lid lamp LDL).

Specifically, as shown in FIG. 2 to FIG. 6, the vehicle lamp 1 includes a first light source 2a and a second light source 2b, a light guide body 3, and the cover lens 4, and the vehicle lamp 1 has a structure in which these are disposed inside lighting bodies (not shown) that constitute the rear combination lamp RCL and the lid lamp LDL.

Further, the lighting body is constituted by a housing with a front surface being opened, and a transparent outer lens configured to cover the opening of the housing. In addition, a shape of the lighting body can be appropriately changed depending on a design or the like of the vehicle.

The first light source 2a and the second light source 2b are symmetrically disposed on both sides with a central axis AX in the other direction (in the embodiment, the upward/downward direction) perpendicular to one direction (in the embodiment, the leftward/rightward direction) of the light guide body 3 sandwiched therebetween.

The first light source 2a and the second light source 2b are constituted by, for example, LEDs configured to emit red light, which are mounted on the side of one surface (in the embodiment, a front surface) of a circuit board 5 on which a driving circuit configured to drive the LEDs is provided. Accordingly, each of the first light source 2a and the second light source 2b radially emits light L forward.

Further, in the embodiment, although one LED is disposed for each of the first light source 2a and the second light source 2b, a plurality of LEDs may be disposed for each of the first light source 2a and the second light source 2b, and this can be changed as appropriate according to the size or the like of the light guide body 3. In addition, the first light source 2a and the second light source 2b are not limited to being mounted on separate circuit boards 5, and may be mounted on the same surface of the same circuit board 5.

Further, while the LEDs that constitute the first light source 2a and the second light source 2b and the driving circuit configured to drive the LEDs are mounted on the circuit board 5 in the embodiment, the mounting board on which the LEDs are mounted and the circuit board on which the driving circuit configured to drive the LEDs are provided may be separately provided, and the mounting board and the circuit board may be electrically connected via a wiring cord referred to as a harness to protect the driving circuit from heat emitted from the LEDs.

The light guide body 3 is integrally formed by, for example, two-color molding of a light transmitting member 31 formed of a transparent resin such as polycarbonate, acryl, or the like, and a light diffusing material 32 in which inorganic particles such as silica, calcium carbonate, or the like, or organic particles P such as silicon, acryl, or the like, having a different refractive index from the light transmitting member 31, are dispersed in a transparent resin. In addition, the light transmitting member 31 and the light diffusing material 32 are made of the same transparent resin so that they have the same refractive index.

The light guide body 3 has a pair of first light guide parts 3a extending in rod shapes in the forward/rearward direction, and a second light guide part 3b extending in a rod shape in the leftward/rightward direction, and front ends of the pair of first light guide parts 3a are connected (linked) by the second light guide part 3b. In addition, the light guide body 3 has a shape that is symmetrical with respect to the central axis AX.

In addition, the light guide body 3 has incidence parts 6 disposed on rear ends of the first light guide parts 3a, reflecting parts 7 disposed between front ends of the first light guide parts 3a and both ends of the second light guide part, and a plurality of light emitting parts 8 disposed side by side in one direction between one end side and the other end side of the second light guide part.

The incidence parts 6 are disposed to face the first light source 2a and the second light source 2b, respectively, and constituted by flat (planar) incidence surfaces 6a configured to cause light L emitted from the light sources 2a and 2b to enter the first light guide parts 3a, respectively.

Accordingly, the light L entering the first light guide parts 3a from each of the incidence surfaces 6a is guided toward the front ends of each of the first light guide parts 3a while repeating reflection in each of the first light guide parts 3a.

Further, the incidence parts 6a are not limited to the above-mentioned incidence surfaces 6a, and for example, may have lens shapes to cause the light L emitted from the first light source 2a and the second light source 2b to enter the first light guide parts 3a while parallelizing or condensing the light L.

The reflecting parts 7 are constituted by reflecting surfaces 7a inclined by a predetermined angle (in the embodiment, 45° with respect to a central axis of the first light guide parts 3a) in a direction in which front end sides of each of the first light guide parts 3a face each other.

Accordingly, the light L reflected by each of the reflecting surfaces 7a is guided in a direction in which the second light guide parts 3b face each other. That is, the light L on one side emitted from the first light source 2a is guided from one end side toward the other end side of the second light guide part 3b while repeating reflection in the second light guide part 3b. Meanwhile, the other light L emitted from the second light source 2b is guided from the other end side of the second light guide part 3b toward the one end side while repeating reflection in the second light guide part 3b.

The plurality of light emitting parts 8 are formed of the light diffusing material 32 in a block shape. Accordingly, each of the light emitting parts 8 can emit the light L in a block shape by diffusing (scattering) the light L using particles P in the light diffusing material 32.

In addition, the light diffusing material 32 has a first connecting part 9 that connects neighboring ones of the light emitting parts 8. The first connecting part 9 connects portions of the light emitting parts 8 among the neighboring light emitting parts 8 except at least front surface sides (in the embodiment, back surface sides) of the light emitting parts 8.

Although the first connecting part 9 is formed of the same light diffusing material 32 as the light emitting parts 8, it is sufficiently smaller than the light emitting parts 8 and is located on the back surface side of the light emitting parts 8, so that it is possible to suppress the first connecting part 9 from emitting light and becoming visible (make inconspicuous) when the light emitting parts 8 emit light.

Meanwhile, the light transmitting member 31 has transmissive parts 10 disposed between the neighboring light emitting parts 8, and a second connecting part 11 configured to connect neighboring ones of the transmissive parts 10.

The transmissive parts 10 are formed of the light diffusing material 32 in a block shape, and disposed in plural side by side in one direction between one end side and the other end side of the second light guide part 3b. Accordingly, the light emitting parts 8 and the transmissive parts 10 are alternately disposed side by side in one direction of the second light guide part 3b.

The second connecting part 11 connects at least portions of the transmissive parts 10 of the neighboring transmissive parts 10 (in the embodiment, front surface sides).

The cover lens 4 is formed of a transparent resin such as polycarbonate, acryl, or the like, and has a shape that covers an upper surface, a front surface and both side surfaces of the light guide body 3. Further, the cover lens 4 is not limited to being colorless and transparent, but may be red and transparent.

In the vehicle lamp 1 of the embodiment having the above-mentioned configuration, as shown in FIG. 7, the light L guided inside the second light guide part 3b passes between the transmissive parts 10 and the light emitting parts 8 in sequence, and emits red light in a block shape from the light emitting parts 8 formed of the light diffusing material 32.

Accordingly, in the vehicle lamp 1 of the embodiment, it is possible to create a three-dimensional effect of the emission. Further, by making the plurality of light emitting parts 8 emit red light in a block shape, it is possible to create the appearance of a plurality of light sources being lit up.

In addition, in the vehicle lamp 1 of the embodiment, by disposing the second light guide part 3b, in which the above-mentioned light emitting parts 8 and the transmissive parts 10 are arranged alternately, protruding forward via the pair of first light guide parts 3a, it is possible to create a floating feeling of emission as if the plurality of light emitting parts 8 are floating.

Further, in the vehicle lamp 1 of the embodiment, by covering the light guide body 3 with the cover lens 4 described above, the shape of the light guide body 3 becomes less noticeable when the light is not lit, and it is possible to improve the appearance when the light is not lit.

As described above, in the vehicle lamp 1 of the embodiment, by disposing the light emitting parts 8 formed of the light diffusing material 32 in the block shape in a part of the light transmitting member 31 that constitutes the second light guide part 3b (the light guide body 3), it is possible to create the three-dimensional effect or the floating feeling of the emission.

Further, the present invention is not particularly limited to the above-mentioned embodiment, and various modifications may be made without departing from the scope of the present invention.

Figure 8:
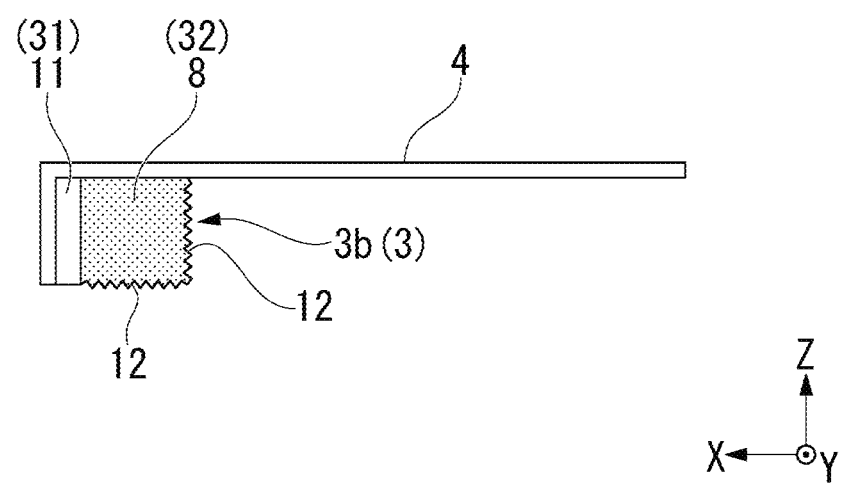
FIG. 8 is a cross-sectional view showing a configuration in which a diffusion part is provided in a light emitting part.

For example, the light emitting parts 8 may be configured to include a diffusion part 12 configured to diffuse the light L emitted from the light emitting parts 8 to the outside, as shown in FIG. 8. The diffusion part 12 is formed by applying fine unevenness cutting or embossing to the surface of the light emitting part 8. Accordingly, when the light emitting parts 8 emit light, the outline of the light emitting parts 8 formed in the block shape can be more emphasized.

Figure 9A:
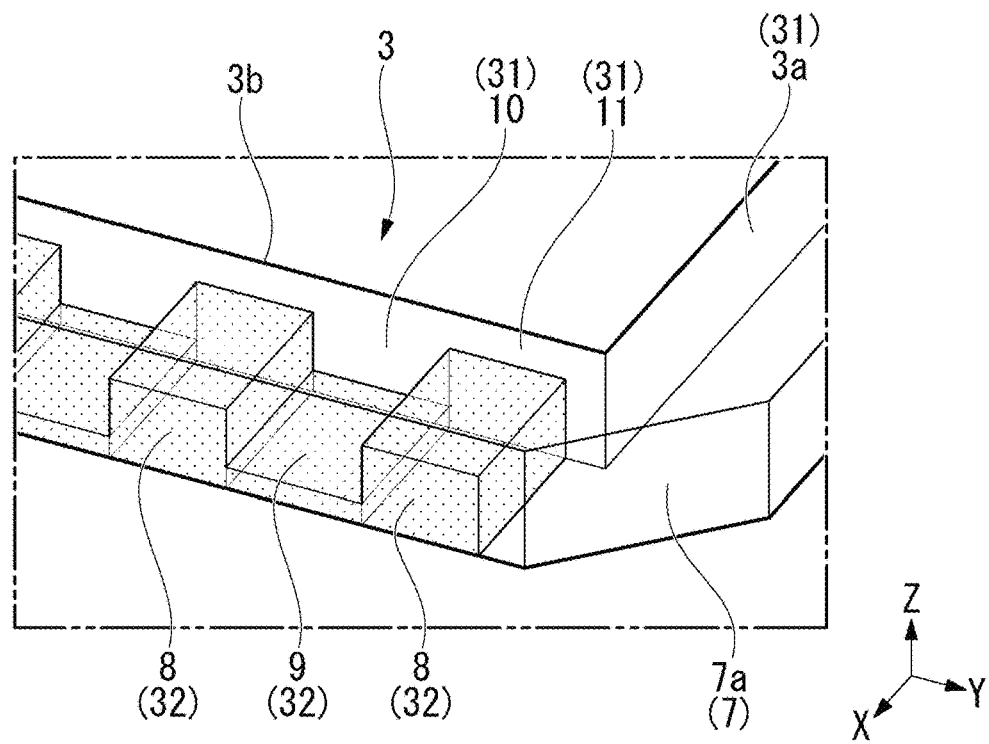
FIG. 9A is a perspective view showing a variant of a first connecting part.
Figure 9B:
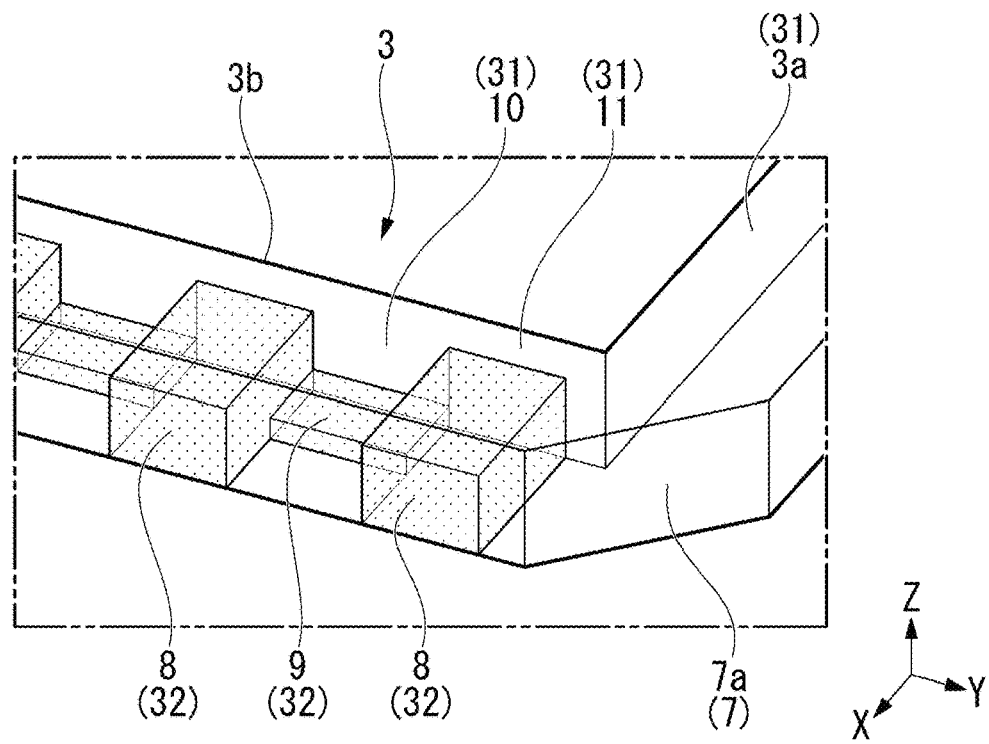
FIG. 9B is a perspective view showing a variant of the first connecting part.

In addition, the first connecting part 9 is not limited to the above-mentioned configuration in which the back surfaces of the neighboring light emitting parts 8 are connected together, but may be configured as shown in, for example, FIGS. 9A and 9B. Among these, the first connecting part 9 shown in FIG. 9A is configured to connect the lower surfaces of the neighboring light emitting parts 8. Meanwhile, the first connecting part 9 shown in FIG. 9B is configured to connect parts of the lower surfaces of neighboring light emitting parts 8.

In this way, the first connecting part 9 is necessary when two-color molding of the above-mentioned light transmitting member 31 and the light diffusing material 32 is performed, but by devising its shape and arrangement, it is possible to prevent the first connecting part 9 from being visible (conspicuous) by emitting light when the light emitting parts 8 emit light.

Further, the light guide body 3 is not necessarily limited to the two-color molding of the light transmitting member 31 and the light diffusing material 32 described above, but may be, for example, a combination of the transmissive parts 10 constituted by the light transmitting member 31 and the light emitting parts 8 constituted by the light diffusing material 32, which are formed separately.

Figure 10A:
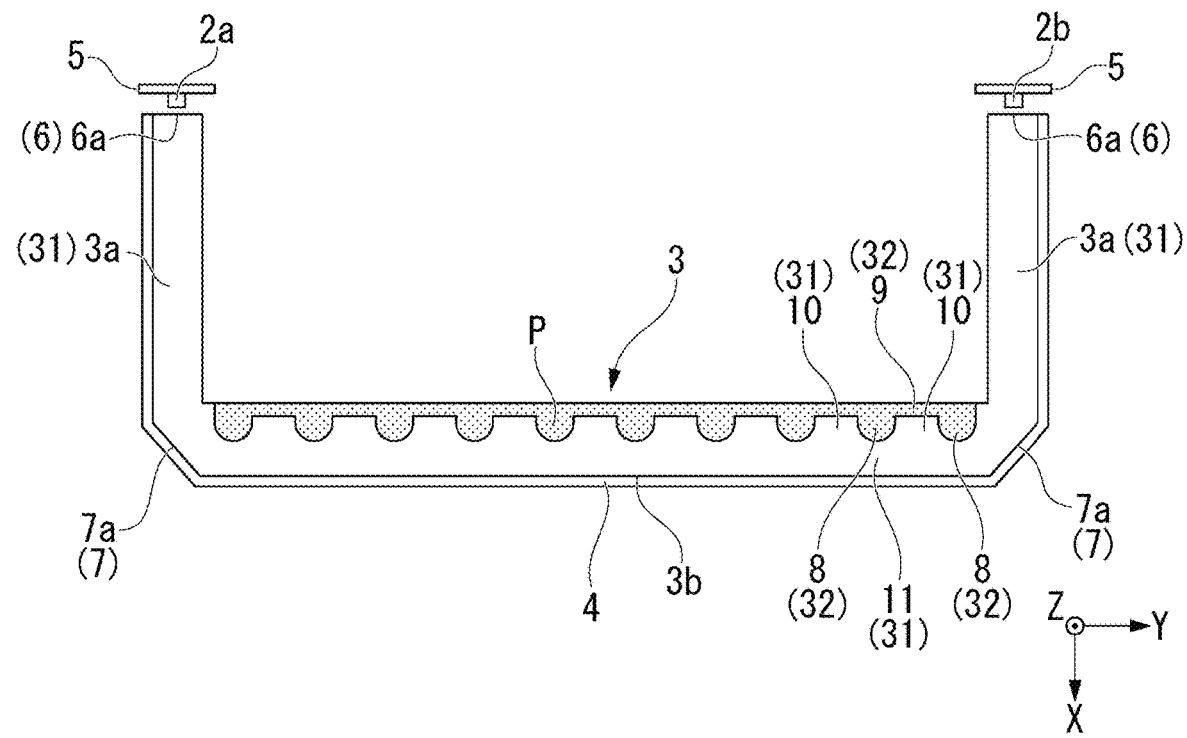
FIG. 10A is a perspective view showing a variant of the light emitting part.
Figure 10B:
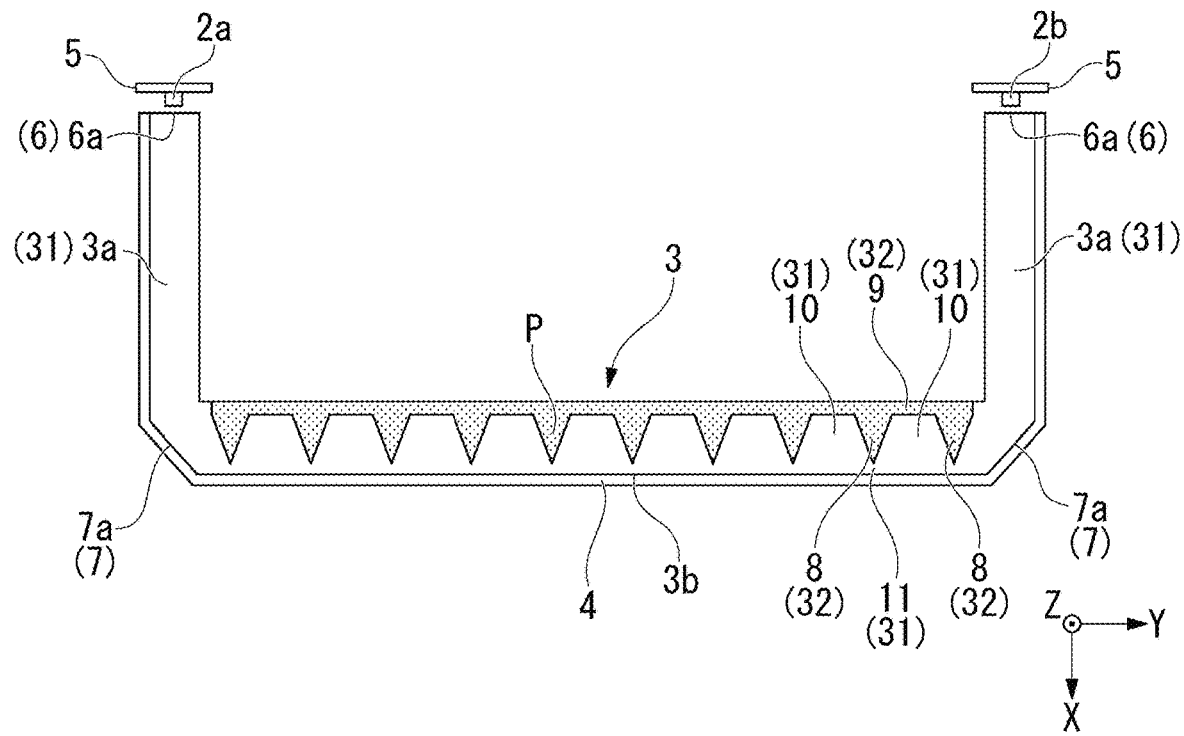
FIG. 10B is a perspective view showing a variant of the light emitting part.

In addition, the shape of the light emitting parts 8 can also be modified as appropriate depending on the design of the actual vehicle, and for example, it is also possible to have the shapes shown in FIG. 10A and FIG. 10B. Among these, the light emitting part 8 shown in FIG. 10A is formed in a semi-cylindrical shape. Meanwhile, the light emitting part 8 shown in FIG. 10B is formed in a triangular prism shape.

Figure 11:
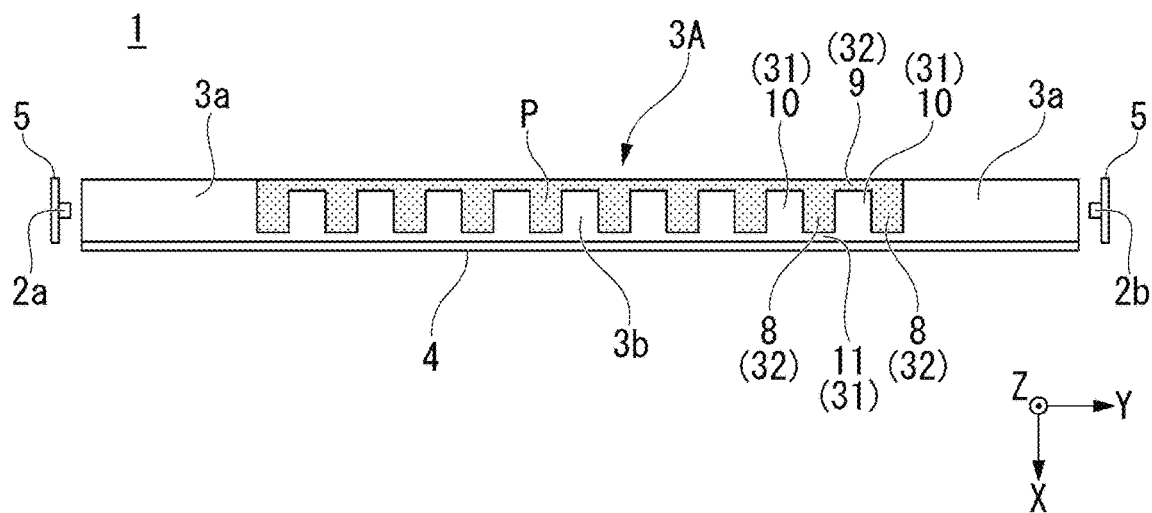
FIG. 11 is a cross-sectional view showing a first variant of a light guide body.

In addition, the shape of the light guide body 3 can be modified as appropriate depending on the design of the actual vehicle. For example, as a first variant, like a light guide body 3A shown in FIG. 11, the reflecting surfaces 7a (the reflecting parts 7) disposed between the pair of first light guide parts 3a and the second light guide part 3b may be omitted, and the pair of first light guide parts 3a and the second light guide part 3b may be linearly connected.

Figure 12:
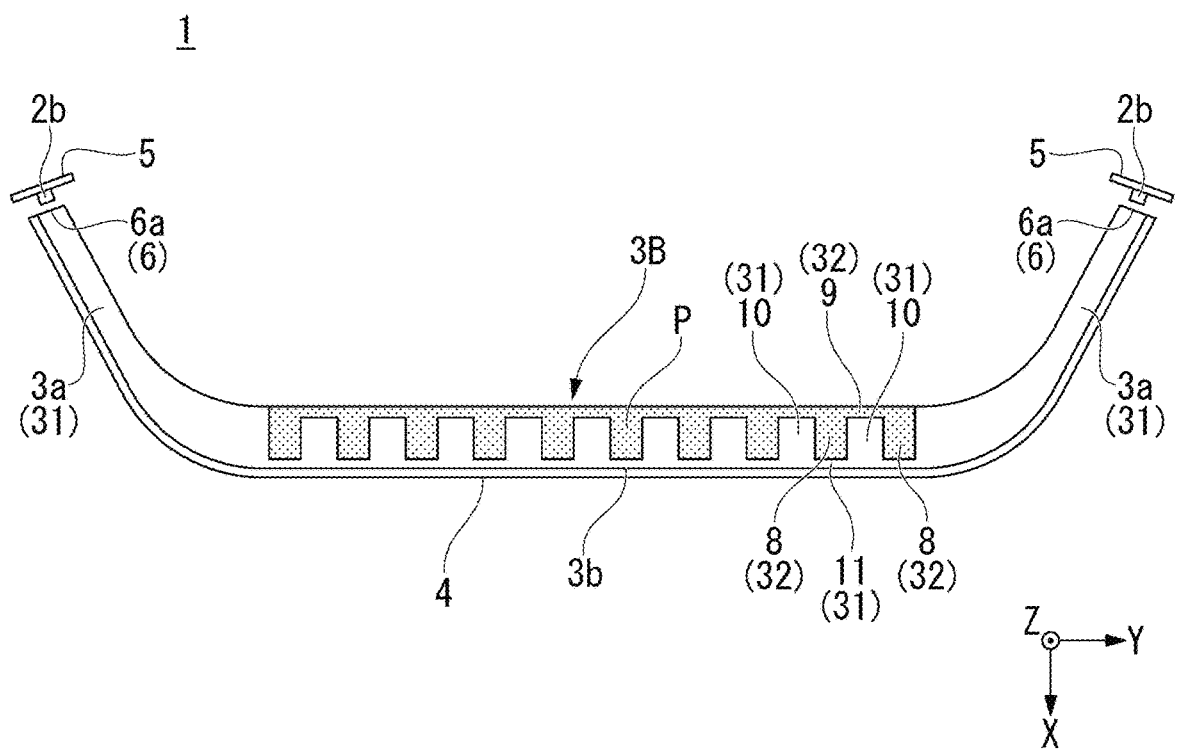
FIG. 12 is a cross-sectional view showing a second variant of the light guide body.

In addition, as a second variant, like a light guide body 3B shown in FIG. 12, the reflecting surfaces 7a (the reflecting parts 7) disposed between the pair of first light guide parts 3a and the second light guide part 3b may be omitted, and the first light guide parts 3a may be curved and connected to the second light guide part 3b.

Figure 13:
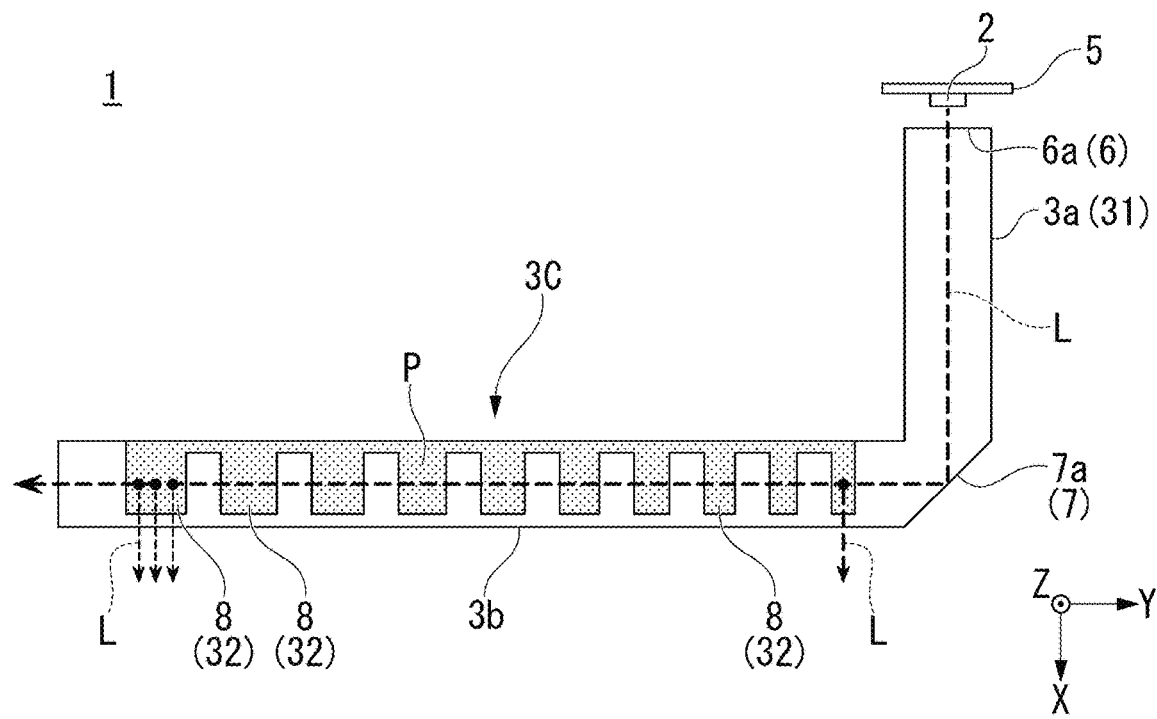
FIG. 13 is a cross-sectional view showing a third variant of the light guide body.

In addition, as a third variant, like a light guide body 3C shown in FIG. 13, any one of the pair of first light guide parts 3a may be omitted, and after the light L emitted from the light source 2 enters the first light guide parts 3a from the incidence surfaces 6a (the incidence parts 6), the light L may be guided from one end side toward the other end side of the second light guide part 3b.

In the case of this configuration, it is preferable to vary the size of the light emitting parts 8 depending on the distance from the light source 2 of the light L guided from one end side toward the other end side of the second light guide part 3b, so that there is no difference in the light intensity (brightness) of the light L diffused and emitted from the plurality of light emitting parts 8 due to differences in the optical path length of the light L guided from one end side toward the other end side of the second light guide part 3b.

Specifically, it is preferable to make the width of the light emitting parts 8 gradually larger as the distance from the light source 2 increases. Accordingly, light intensity (brightness) of the light L diffused and emitted from the plurality of light emitting parts 8 can be uniformized between the one end side and the other end side of the second light guide part 3b.

Figure 14:
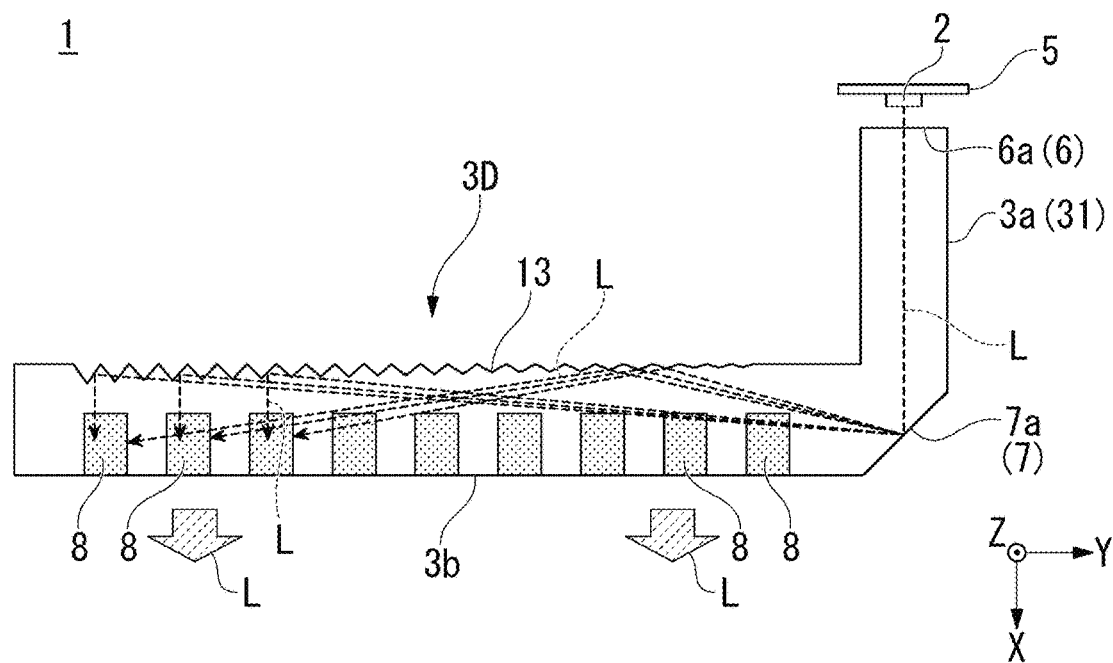
FIG. 14 is a cross-sectional view showing a fourth variant of the light guide body.

In addition, as a fourth variant, like a light guide body 3D shown in FIG. 14, a plurality of reflection cuts 13 configured to reflect the light L guided from one end side toward the other end side of the second light guide part 3b toward the light emitting parts 8 may be provided on the second connecting part 11 and the transmissive parts 10.

In the embodiment, the plurality of reflection cuts 13 configured to reflect the light L guided from one end side toward the other end side of the second light guide part 3b toward the light emitting parts 8 located on the front surface side of the second light guide part 3b are provided on the back surface side of the second connecting part 11 and the transmissive parts 10.

The plurality of reflection cuts 13 are formed by groove parts having an approximately V-shaped cross section that are cut out in the other direction (upward/downward direction) of the second light guide part 3b and are periodically arranged in one direction (leftward/rightward direction) of the second light guide part 3b.

In order to dispose the plurality of reflection cuts 13 in the light transmitting member 31, the light guide body 3D is configured such that the second connecting part 11 connects the back surface sides of the transmissive parts 10 between neighboring transmissive parts 10. Meanwhile, as shown in FIG. 9A described above, the first connecting part 9 connects the lower surface sides of the neighboring light emitting parts 8.

Further, the second connecting part 11 is not necessarily limited to the configuration described above in which the back surface sides of the neighboring transmissive parts 10 are connected, but may be configured to connect the neighboring transmissive parts 10 other than the front surface sides of the transmissive parts 10. Accordingly, the plurality of reflection cuts 13 can be provided on side surfaces other than the front surfaces of the second connecting part 11 and the transmissive parts 10.

In the case of this configuration, it is preferable to vary the size of the plurality of reflection cuts 13 depending on the distance from the light source 2 of the light L guided from one end side toward the other end side of the second light guide part 3b so that no difference is occurred in the light intensity (brightness) of the light L diffused and emitted from the plurality of light emitting parts 8 due to differences in the optical path length of the light L which is guided from one end side toward the other end of the second light guide part 3b.

Specifically, it is preferable that the depth of the groove parts constituting the plurality of reflection cuts 13 be gradually increased as the distance from the light source 2 increases. Accordingly, light intensity (brightness) of the light L diffused and emitted from the plurality of light emitting parts 8 can be uniformized between one end side and the other end side of the second light guide part 3b.

Figure 15A:
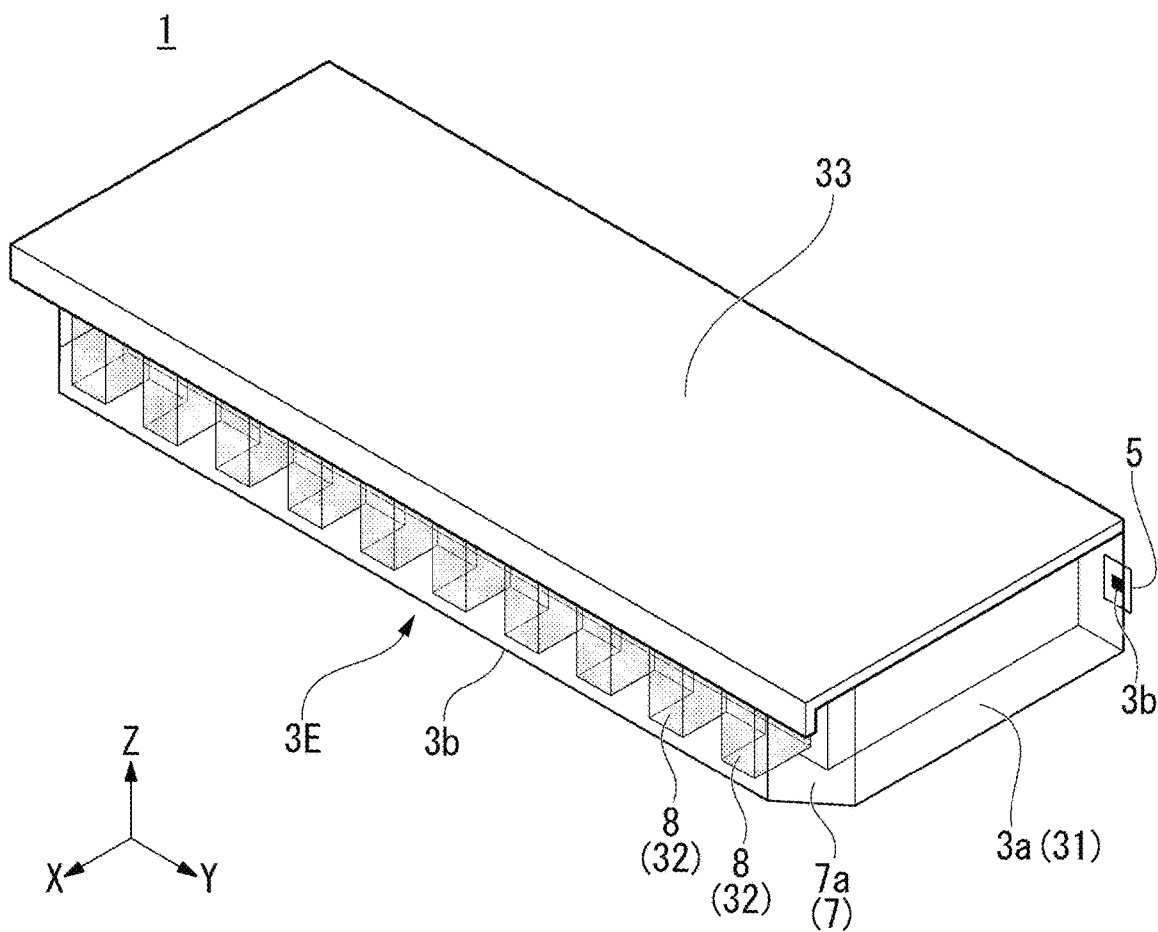
FIG. 15A is a cross-sectional view showing a fifth variant of the light guide body.
Figure 15B:
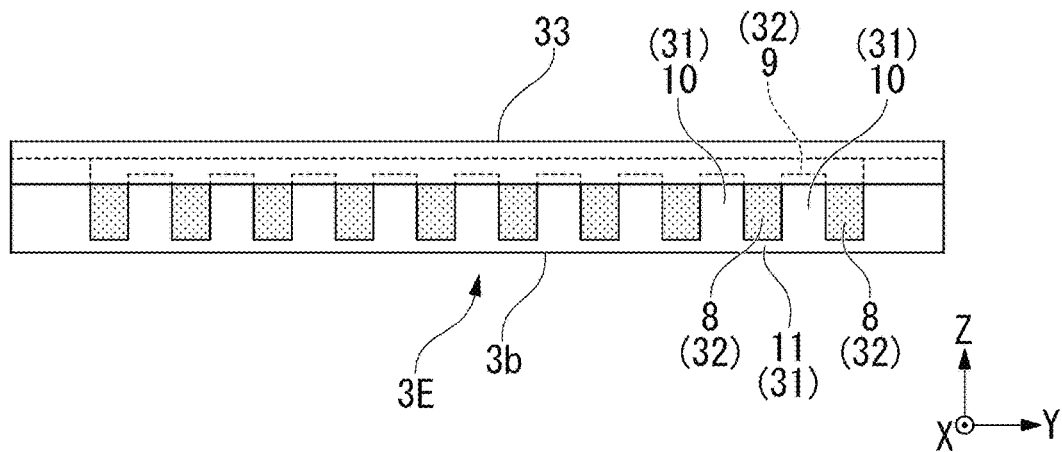
FIG. 15B is a cross-sectional view showing the fifth variant of the light guide body.

In addition, as a fifth variant, like a light guide body 3E shown in FIG. 15A and FIG. 15B, a configuration including a light shielding member 33 covering at least the first connecting part 9 may also be used.

The light shielding member 33 is made of a resin such as polycarbonate, acryl, or the like, that contains light blocking (for example, black) pigments. The light guide body 3E is integrally formed by three-color molding of the light transmitting member 31, the light diffusing material 32, and the light shielding member 33. Further, the light shielding member 33 is not limited to being formed integrally with the light transmitting member 31 and the light diffusing material 32 described above, but may be formed separately.

The first connecting part 9 connects upper surface sides of the neighboring light emitting parts 8. The light shielding member 33 is disposed so as to cover the area that overlaps with the first connecting part 9 of the light guide body 3E when seen in a front view, and the entire upper surface side of the light guide body 3E.

Accordingly, during emission from the light emitting parts 8, the light shielding member 33 prevents the first connecting part 9 from being visible, thereby creating a floating feeling of emission from the plurality of light emitting parts 8.

Figure 16:
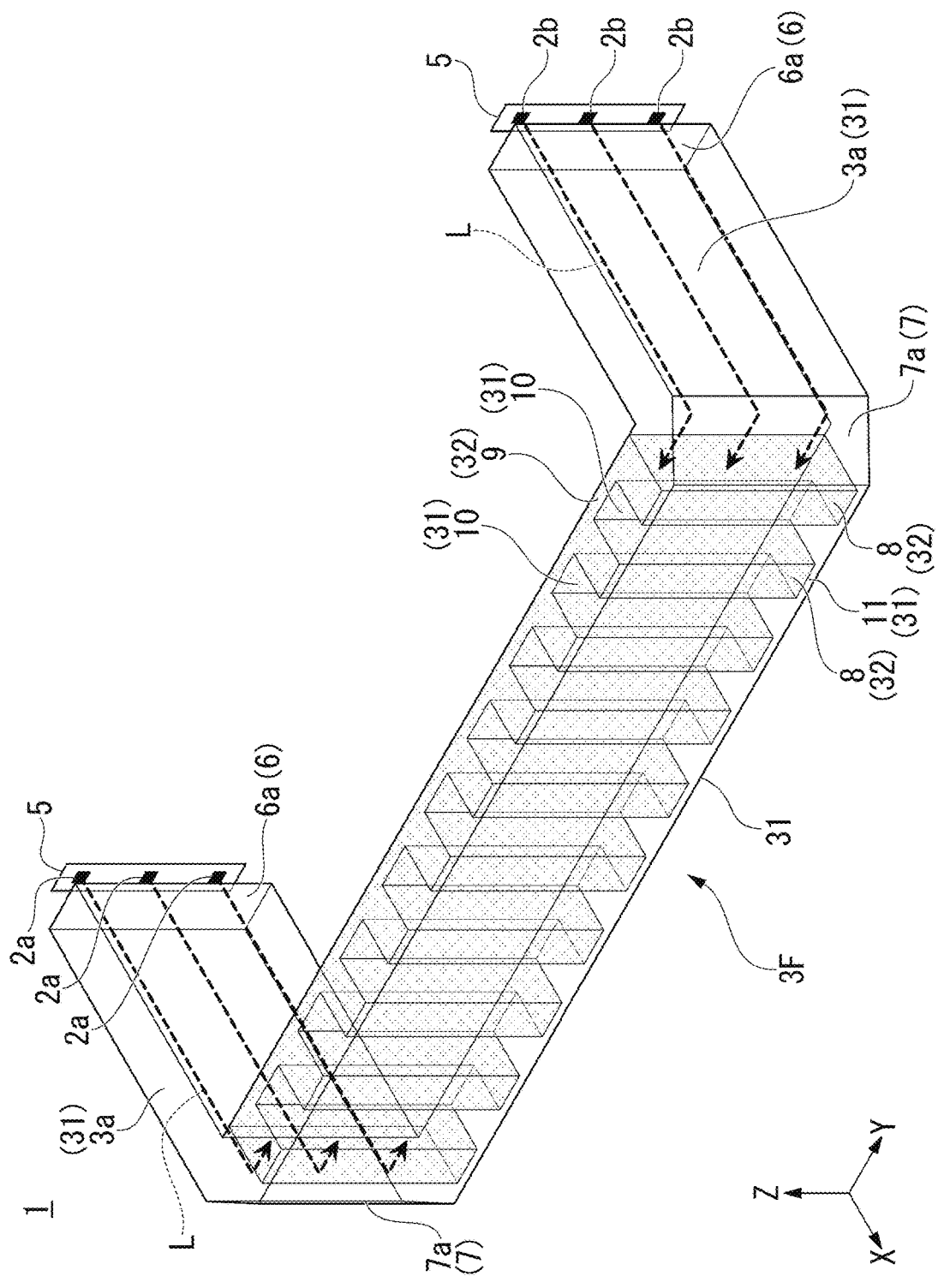
FIG. 16 is a cross-sectional view showing a sixth variant of the light guide body.

In addition, the light guide body of the present invention is not limited to the configuration of the rod-shaped light guide body (light guide rod) 3, 3A to 3E extending in one direction (leftward/rightward direction) as described above, but may also be, as a sixth variant, for example, a plate-shaped light guide body (light guide plate) extending in one direction (leftward/rightward direction) and also extending in the other direction (upward/downward direction) perpendicular to the one direction, such as a light guide body 3F shown in FIG. 16.

Specifically, the light guide body 3F has a plate shape extending in the upward/downward direction from the rod-shaped light guide body 3 described above. In the case of this configuration, the first light source 2a and the second light source 2b are disposed side by side in the upward/downward direction.

Accordingly, in the plate-shaped light guide body 3F, it is possible to create the three-dimensional effect or the floating feeling of the emission while emitting light from the plurality of light emitting parts 8 extending in the upward/downward direction.

Further, in the embodiment, although the present invention has been applied to the tail lamps TLL1 and TLL2 described above as an example, the present invention can be applied to a wide range of vehicle lamps, including, but not limited to, the tail lamps described above, headlights for vehicle (head lamps), width indicators (position lamps), auxiliary headlights (sub-head lamps), front (rear) fog lamps, daytime running lamps, brake lamps (stop lamps), back lamps, and direction indicators (winker lamps).

In addition, for the first light source 2a and the second light source 2b, in addition to the above-mentioned LEDs, it is also possible to use light emitting elements such as laser diodes (LDs) or the like. In addition, the color of the light emitted by the light source is not limited to the red light described above, but can be changed appropriately depending on the purpose of the vehicle lamp, such as white light, orange light, or the like.

REFERENCE SIGNS LIST

1 Vehicle lamp
2 Light source
2a First light source
2b Second light source
3, 3A to 3F Light guide body
3a First light guide part
3b Second light guide part
4 Cover lens
5 Circuit board
6 Incidence part
7 Reflecting part
8 Light emitting part
9 First connecting part
10 Transmissive part
11 Second connecting part
12 Diffusion part
13 Reflection cut
31 Light transmitting member
32 Light diffusing material
33 Light shielding member
L Light

The invention claimed is:

1. A vehicle lamp comprising:
light sources; and
a light guide body configured to guide light emitted from the light sources from one end side toward an other end side of the light guide body,
wherein the light guide body has a shape in which a first light guide part located in front of the light source and a second light guide part extending in one direction between the one end side and the other end side are connected,
wherein the second light guide part has a plurality of light emitting parts, which are disposed side by side in the one direction and which are configured to emit the light by diffusing the light, and transmissive parts which are disposed between neighboring light emitting parts and which are configured to transmit the light,
wherein the light emitting parts are configured by disposing a light diffusing material in a part of a light transmitting member that constitutes the light guide body,
wherein the light diffusing material includes a first connecting part that connects neighboring ones of the light emitting parts,
wherein the first connecting part connects part of neighboring light emitting parts other than at least front surface sides of the light emitting parts, and
wherein the vehicle lamp further comprises a light shielding member disposed to cover a range overlapping with the first connecting part of the light guide body when seen in a front view and an entire surface of the light guide body on an upper surface side.

2. The vehicle lamp according to claim 1, wherein the light sources are disposed on both ends of the light guide body so as to face each other, and the light guide body guides one light emitted from one light source from the one end side toward the other end side of the light guide body, and guides other light emitted from an other light source from the other end side toward the one end side of the light guide body.

3. The vehicle lamp according to claim 1, wherein the light guide body is formed by two-color molding of the light transmitting member and the light diffusing material.

4. The vehicle lamp according to claim 1, wherein the light transmitting member includes a second connecting part that connects neighboring ones of the transmissive parts, and the second connecting part connects at least parts of the transmissive parts of neighboring transmissive parts.

5. The vehicle lamp according to claim 4, wherein the second light guide part has a plurality of reflection cuts that is disposed on the second connecting part and the transmissive parts and that is configured to reflect light toward the light emitting part.

* * * * *